United States Patent [19]

Spencer et al.

[11] 3,769,583

[45] Oct. 30, 1973

[54] DIGITAL INDICATOR WITH MEANS FOR SUPPRESSING LEAST SIGNIFICANT DIGIT DITHER

[75] Inventors: Richard B. Spencer; Arthur R. Winter, both of Phoenix, Ariz.

[73] Assignee: Sperry Rand Corporation, New York, N.Y.

[22] Filed: Mar. 15, 1971

[21] Appl. No.: 124,091

[52] U.S. Cl. .................. 324/78 D, 328/72, 328/140

[51] Int. Cl. ...................... G01r 23/02, H03k 17/26

[58] Field of Search ........................ 324/78, 186, 72, 324/129; 328/140, 72

[56] References Cited

UNITED STATES PATENTS

| | | | |
|---|---|---|---|
| 3,304,504 | 2/1967 | Horlander | 328/140 |
| 3,553,728 | 1/1971 | Frank et al. | 324/78 D |
| 3,581,196 | 5/1971 | Spaid | 324/186 X |
| 3,432,687 | 3/1969 | Emmer | 324/186 X |

*Primary Examiner*—Alfred E. Smith
*Attorney*—S. C. Yeaton

[57] ABSTRACT

A digital indicator comprising a counter for providing digital representations of the frequency of an input signal. The input signal is applied to the counter through a gate responsive to a periodically occurring timing pulse. The timing pulse is derived from a second counter that receives fixed frequency clock pulses through a second gate. Synchronizing means, responsive to the input signal, operate the second gate whereby the timing pulse is controlled to occur in timed relation to the input signal.

5 Claims, 2 Drawing Figures

INVENTORS
RICHARD B. SPENCER
ARTHUR R. WINTER
BY
HP Terry
ATTORNEY

DIGITAL INDICATOR WITH MEANS FOR SUPPRESSING LEAST SIGNIFICANT DIGIT DITHER

BACKGROUND OF THE INVENTION

1. Field of the Invention

The present invention relates to digital frequency indicators and is particularly directed to the problem of least significant digit dither.

2. Description of the Prior Art

Digital frequency indicators are known in the prior art that periodically gate the input signal into a counter for a fixed time duration under control of a timing pulse. The count achieved by the counter after termination of each timing pulse is gated through appropriate buffers and converters into decimal readout indicators which provide the desired digital represen-tations of the frequency of the input signal.

The timing pulse that periodically gates the input signal into the counter is derived from a continuously running second counter whose input is directly connected to the output of a continuously operating fixed frequency clock pulse source. The timing pulse provided by the second counter occurs in accordance with a time base established by the clock pulse source. Since the occurrence of the input signal is unsynchronized with respect to this time base, the timing pulses occur in an unsynchronized manner with respect to the input signal. Thus the fixed duration timing pulses span one cycle more or less of the input signal dependent on the instantaneous phase relationship therebetween. Consequently, the least significant digit readout indicator dithers between two consecutive digits although the frequency of the input signal is not varying.

The least significant digit dither of prior art indicators is ordinarily undesirable and is particularly objectionable in digital indicating flight instruments. The digit dither of a plurality of instruments on the aircraft instrument panel would create a distraction that may divert the pilot's attention otherwise required in executing critical flight maneuvers.

Prior art techniques for solving this problem involve reducing the data update rate so that the resultant dither would not be objectionable to the pilot. Because of the slow update rate, prior art digital indicators do not properly follow rapidly occurring fluctuations of the input parameters. An alternative prior art solution to the problem is to mask the least significant digit of the indicator when objectionable dither occurs. This results in a loss of data that may have otherwise provided valuable information to the pilot.

SUMMARY OF THE INVENTION

The prior art digit dither problem is obviated by the present invention by the inclusion in the prior art system of synchronizing circuits responsive to the input signal, whose frequency is to be measured, for causing the timing pulses that gate the input signal to the indicating counter to occur in timed relation with respect to the input signal.

DESCRIPTION OF THE PREFERRED EMBODIMENT

A graphic explanation of the phenomenon that causes digit dither will now be given to facilitate an understanding of the description of the preferred embodiment of the invention to follow.

Figure 1:
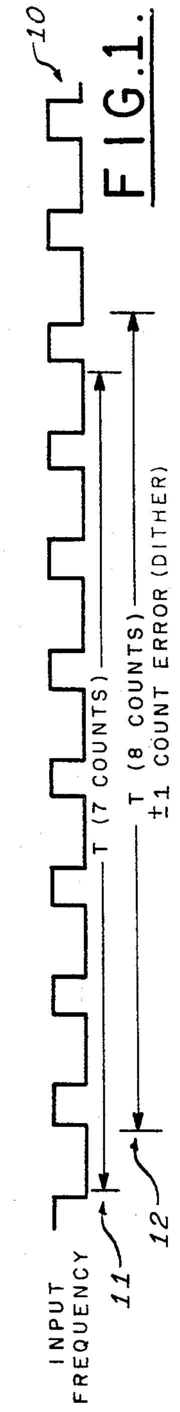
FIG. 1 is a waveform diagram graphically illustrating the timing relationship that causes digit dither.

Referring to FIG. 1, an input signal 10 having a frequency representative of an associated parameter is gated into an indicating counter by timing pulses of duration T. Since in the absence of the present invention the time base that generates the timing pulses is not synchronized with respect to the input signal 10, the timing pulses may occur with arbitrary phase relative to the phase of the input signal 10. Thus, the number of pulses of the input signal 10 that is spanned by the timing pulse of duration T may vary by one pulse in accordance with the relative phases. For example, a timing pulse 11 of duration T spans seven cycles of the input signal 10 while a timing pulse 12, also of duration T, spans eight cycles thereof. It is thus appreciated that because of this $\pm$ 1 count ambiguity, the least significant digit of the associated indicator will dither between consecutive integers although the frequency of the input signal 10 is not varying.

Figure 2:
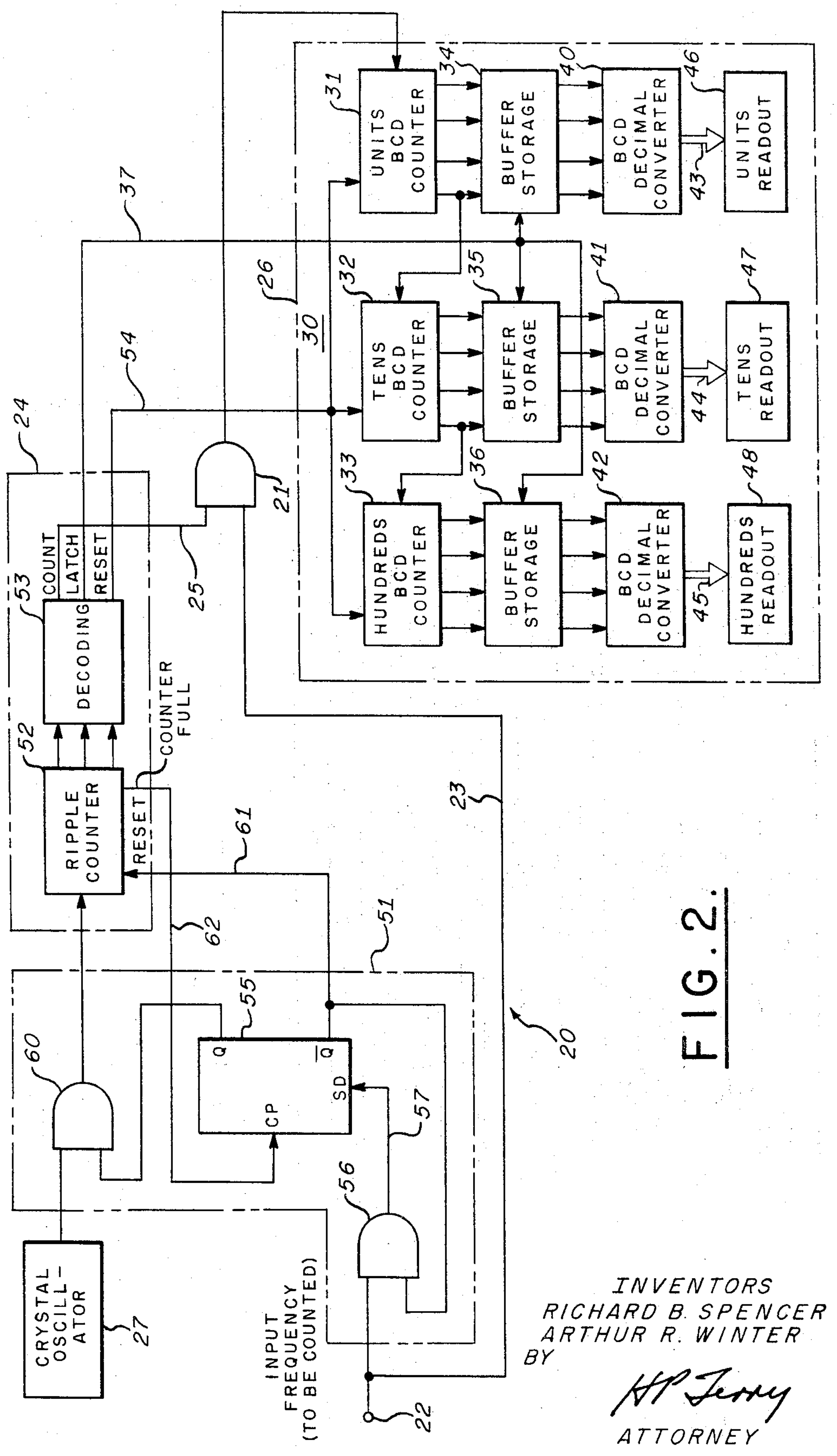
FIG. 2 is a block schematic diagram of the preferred embodiment of the invention.

Referring to FIG. 2, a digital indicator 20 embodying the principles of the present invention, is illustrated. An input signal whose frequency is to be displayed is applied as an input to an AND gate 21 via an input terminal 22 and a conductor 23. The other input to the AND gate 21 is applied from timing circuits comprising counting circuits 24 and a pulse source 27 which provide a repetitive fixed duration timing or count pulse on a conductor 25 in a manner to be described. When the timing pulse is applied to the conductor 25 by the timing circuits 24, 27 the AND gate 21 is rendered conductive thereby transmitting the input signal on the conductor 23 to counting circuits 26. The AND gate 21 will transmit a number of cycles of the input signal on the conductor 23 in accordance with the duration of the timing pulse applied to the conductor 25.

The counting circuits 26 include a conventional three-stage binary coded decimal (BCD) pulse counter 30 to which the output of the AND gate 21 is applied. The counter 30 is comprised of units, tens and hundreds stages 31, 32 and 33 respectively, connected in conventional cascade fashion. The digital count outputs of the counter stages 31, 32 and 33 are applied as inputs to buffer storage circuits 34, 35 and 36, respectively. The buffer storage circuits 34, 35 and 36, are conventional devices for storing the instantaneous outputs of the respective counter stages 31, 32 and 33 upon receipt of a latching pulse on a conductor 37 from the timing circuits 24, 27. The BCD outputs of the buffer storage circuits 34, 35 and 36 are applied as inputs to conventional BCD-to-decimal converters 40, 41 and 42, respectively. The circuits 40, 41 and 42 convert the respective binary coded decimal inputs into discrete signals on the one of 10 conductors of the ten-wire cables 43, 44 and 45, respectively, in accordance with the decimal digits represented by the outputs of the respective buffer storage circuits 34, 35 and 36. The 10 conductor cables 43, 44 and 45 provide inputs to conventional decimal digit readout indicators 46, 47 and 48, respectively. It is appreciated that between latching pulses on the conductor 37 the indicators 46, 47 and 48 continuously display the decimal units, tens and hundreds digits of the number stored in the circuits 34, 35 and 36, respectively. The readout indicators 46, 47 and 48 provide digital representations of the frequency of the input signal applied to the terminal 22 in a manner to be described. Additional digits (thousands, etc.) could be coded by adding a counter stage, buffer, decoder and readout similar to the counter stage 33, buffer 36, decoder 42 and readout 48.

The digital indicator 20 includes the previously mentioned source of cyclic signals 27. The source 27 may, for example, comprise a crystal controlled clock pulse oscillator. The output of the clock pulse source 27 is applied through a synchronizing circuit 51, to be later described, as an input to the counting circuits 24 and together comprise the previously mentioned timing circuits 24, 27.

The counting circuits 24 include a conventional ripple counter 52 to which the clock pulses from the source 27 are applied through the synchronizing circuit 51. The digital count outputs of the counter 52 are applied as inputs to a conventional decoding circuit 53. The circuits of the decoder 53 are conventionally arranged to provide the timing and latch pulses on the conductors 25 and 37, respectively, as well as a reset pulse on a conductor 54 in accordance with predetermined counts attained by the counter 52 in response to the clock pulses applied to its input from the source 27. For convenience, a count toward the beginning of the counting sequence of the ripple counter 52 is normally chosen to initiate the timing pulse on the conductor 25 and a count toward the end of the counting sequence thereof is usually selected to generate the trailing edge of the timing pulse. The full count of the counter 52 may be utilized to generate the latch pulse on the conductor 37 and the zero count of the counter 52 may be utilized to generate the reset pulse on the conductor 54 for reasons to be discussed.

In accordance with the present invention, the synchronizing circuit 51 is included in the digital indicator 20 to reduce the dither of the least significant digit readout indicator 46. The synchronizing circuit 51 includes a bistable element 55 which, for example, may comprise a conventional flip-flop. A two-input AND gate 56 receives the input signal on the terminal 22 as one of its inputs and the $\bar{Q}$ output of the flip-flop 55 as its second input. The output of the AND gate 56 is applied to the set direct input of the flip-flop 55 on a conductor 57. It is thus understood that when the flip-flop 55 is in the $\bar{Q}$ state, the AND gate 56 is enabled so that an input pulse at the terminal 22 sets the flip-flop 55 to the Q state, thereby disabling the AND gate 56.

The Q output of the flip-flop 55 is connected to a two-input AND gate 60, the other input of which is derived from the clock pulse source 27. The output of the AND gate 60 is applied as the input to the ripple counter 52 as previously mentioned. It is thus appreciated that when the flip-flop 55 is in the Q state, the AND gate 60 is enabled to transmit the clock pulses from the source 27 to the ripple counter 52, and when the flip-flop 55 is in the $\bar{Q}$ state the AND gate 60 is disabled from transmission. The $\bar{Q}$ output of the flip-flop 55 also provides a reset signal on a conductor 61 to reset the ripple counter 52 to its zero state. The ripple counter 52 provides a pulse on a conductor 62 when the counter attains its full count. This full counter pulse on the conductor 62 is applied to the clock pulse input of the flip-flop 55 to toggle the flip-flop from the Q state to the $\bar{Q}$ state for reasons to be discussed.

In operation, an input signal with frequency to be measured by the digital indicator 20 is applied to the terminal 22. A data updating operation of the device will be explained beginning at a point in time where the counters 30 and 52 are reset to their zero counts and the flip-flop 55 is in the $\bar{Q}$ state. The decimal digit indicators 46, 47 and 48 are displaying the decimal digits stored in the respective buffers 34, 35 and 36 from the previous data updating operation. Since the flip-flop 55 is in the $\bar{Q}$ state, the AND gate 60 is disabled from transmitting clock pulses to the counter 52. The AND gate 56, however, is enabled and awaiting the next occurring input pulse on the terminal 22.

The next input pulse to occur is transmitted through the enabled gate 56 to set the flip-flop 55 to the Q state. The AND gate 60 is thus enabled and the AND gate 56 is disabled. The clock pulses from the source 27 are applied to the ripple counter 52 which commences counting upwardly from zero. When the count associated with the leading edge of the timing pulse is attained by the counter 52, the timing pulse is initiated on the conductor 25 by the decoder 53. The timing pulse on the conductor 25 enables the AND gate 21 which transmits the input signal to the counter 30. The counter 30 then commences counting upwardly from zero in binary coded decimal in response to the pulses of the input signal. When the ripple counter 52 attains the count associated with the trailing edge of the timing pulse, the decoding circuit 53 terminates the timing pulse thereby disabling the AND gate 21 from further transmission of input signal pulses. The count attained by the counter 30 over the duration of the timing pulse is representative of the frequency of the input signal.

Since the ripple counter 52 is still counting upwardly in response to the clock pulses from the source 27, the decoding circuit 53 next provides the latch pulse on the conductor 37. The latch pulse strobes the number in the counter 30 into the buffer storage circuits 34, 35 and 36, thereby obliterating the number previously stored therein. The readout indicators 46, 57 and 48 then respond to this newly stored number providing an updated digital representation of the frequency of the input signal.

When the ripple counter 52 attains its full count, a pulse is generated on the conductor 62 which toggles the flip-flop 55 back to the $\bar{Q}$ state. The $\bar{Q}$ output of the flip-flop 55 then resets the ripple counter 52 to the zero count via the conductor 61. The decoding circuit 53, in response to this zero count condition, provides the reset pulse on the conductor 54 resetting the counter 30 to zero. Since the flip-flop 55 is again in the $\bar{Q}$ state, the AND gate 60 is disabled and the AND gate 54 is enabled awaiting the next occurring input pulse on the terminal 22 to again update the data stored in the indicators 46, 47 and 48.

Although the set-direct and clock-pulse inputs to the flip-flop 55 were used as described above in the instrumentation illustrated in FIG. 2, it is appreciated that other well known flip-flop configurations may be utilized to the same effect. For example, the counter-full signal on the conductor 62 may be applied to the reset-direct input of the flip-flop 55 (not shown). Alternatively, the signals on the conductors 57 and 62 may be connected through an OR gate (not shown) to provide the input to the clock-pulse terminal of the flip-flop.

It is appreciated that the data update rate of a digital indicator utilizing the synchronizing circuit of the present invention is substantially as fast as that of prior art indicators without the synchronizing circuit. This is so because after an update operation, the circuit need only wait until the receipt of the next occurring input pulse before again commencing updating.

The rapid update capability and the stability of the readout achievable by utilizing the present invention are particularly desirable properties when the invention is applied to aircraft digital flight instruments. For example, the invention may find utility in a jet engine fan r.p.m. indicator where the readout is in percentage of maximum r.p.m. The clock pulse source 27, the ripple counter 52 and the decoding circuit 53 may accordingly be constructed so that the timing pulse on the conductor 25 spans a number of input pulses that would result in the indicators 46, 47 and 48 displaying the number 100 when the engine fan is at maximum r.p.m. System linearity would then provide the required percentage readout.

It is appreciated from the foregoing that since the timing pulses on the conductor 25 are always synchronized with the pulses of the input signal applied to the terminal 22, the dither of the least significant digit readout indicator 46 is minimized or eliminated. The reduction in dither is proportional to the ratio of the frequency of the clock pulses provided by the source 27 relative to the frequency of the input signal on the terminal 22.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. An indicator for providing digital representations of the frequency of an input signal comprising counting means for providing said digital representations, timing means for providing a timing pulse of predetermined duration, gating means connected to receive said input signal and said timing pulse for transmitting said input signal to said counting means during said duration of said timing pulse, and synchronizing means connected to receive said input signal for initiating said timing pulse in timed relation to said input signal, wherein said timing means comprises a source of cyclic signal and further counting means coupled through said synchronizing means to receive said cyclic signal for providing said timing pulse in accordance with predetermined counts thereof, wherein said synchronizing means comprises bistable means providing first and second control signals in accordance with the first and second states thereof, respectively, further gating means coupled to receive said cyclic signal and said first control signal for transmitting said cyclic signal to said further counting means in response to said first control signal and additional gating means coupled to receive only said input signal and said second control signal for transmitting said input signal to said bistable means in response to said second control signal for setting said bistable means to said first state, said further counting means providing a signal representative of a predetermined count thereof coupled to said bistable means for resetting said bistable means to said second state.

2. The indicator of claim 1 in which said further counting means comprises a first pulse counter coupled to receive said cyclic signal transmitted through said further gating means for providing first digital count signals in response thereto, and decoding means coupled to receive said first digital count signals for providing said timing pulse and a latch pulse thereafter in response to predetermined counts of said first pulse counter.

3. The indicator of claim 1 in which said counting means comprises a second pulse counter coupled to receive said input signal transmitted through said gating means for providing second digital count signals in response thereto, buffer storage means coupled to receive said second digital count signals and said latch pulse for storing the instantaneous values of said second digital count signals in response to said latch pulse, and readout means coupled to said buffer storage means for providing said digital representations of said frequency of said input signal in accordance with said stored instantaneous values of said second digital count signals.

4. The indicator of claim 3 in which said readout means comprises converter means coupled to said buffer storage means for converting said stored second digital count signals to signals representative of decimal digits, and decimal digit indicator means responsive to said decimal digit signals for displaying said decimal digits thereby providing said digital representations of said frequency of said input signal.

5. The indicator of claim 3 in which said decoding means includes means for providing a reset pulse after said latch pulse to reset said second pulse counter to a reference state.

* * * * *